Dec. 9, 1969  F. S. WALKER  3,482,366
LEAKPROOF RUBBER SEAL ASSEMBLY
Filed Feb. 28, 1968  4 Sheets-Sheet 1

Inventor:
Frank S. Walker,
by Robert A. Churchill
Attorney

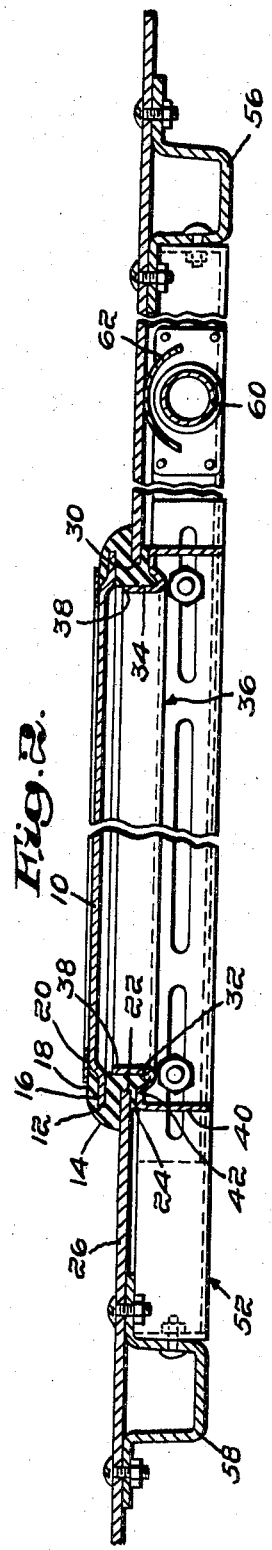

Dec. 9, 1969     F. S. WALKER     3,482,366
LEAKPROOF RUBBER SEAL ASSEMBLY
Filed Feb. 28, 1968     4 Sheets-Sheet 3
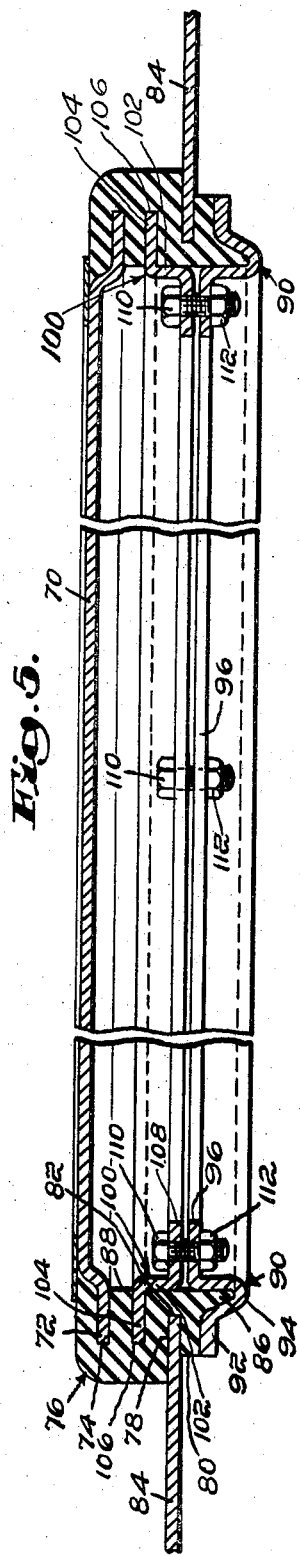
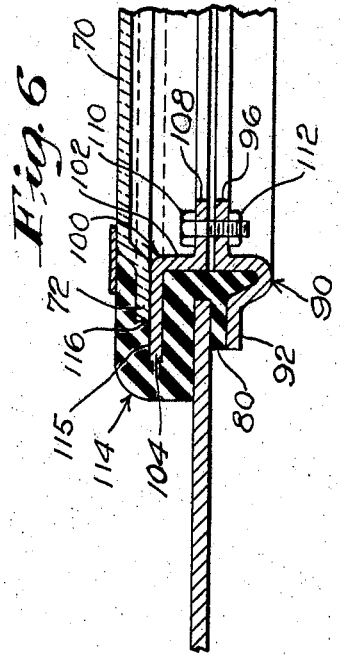
Inventor:
Frank S. Walker,
by Roberts Churchill
Attorney Dec. 9, 1969    F. S. WALKER    3,482,366
LEAKPROOF RUBBER SEAL ASSEMBLY
Filed Feb. 28, 1968    4 Sheets-Sheet 4
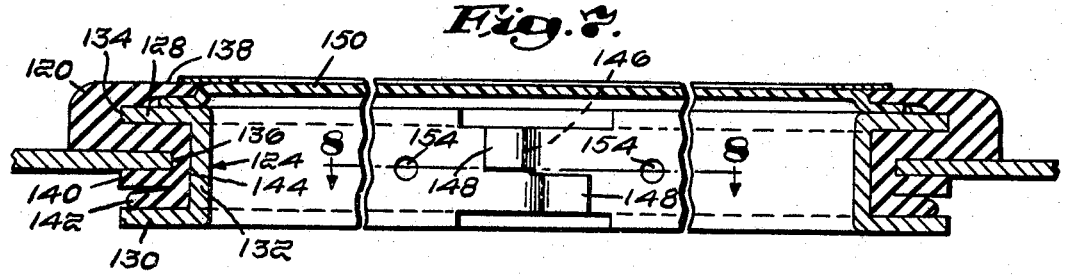
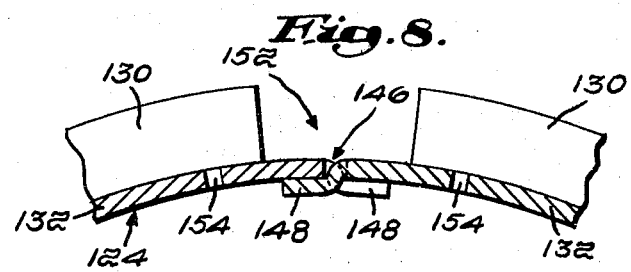
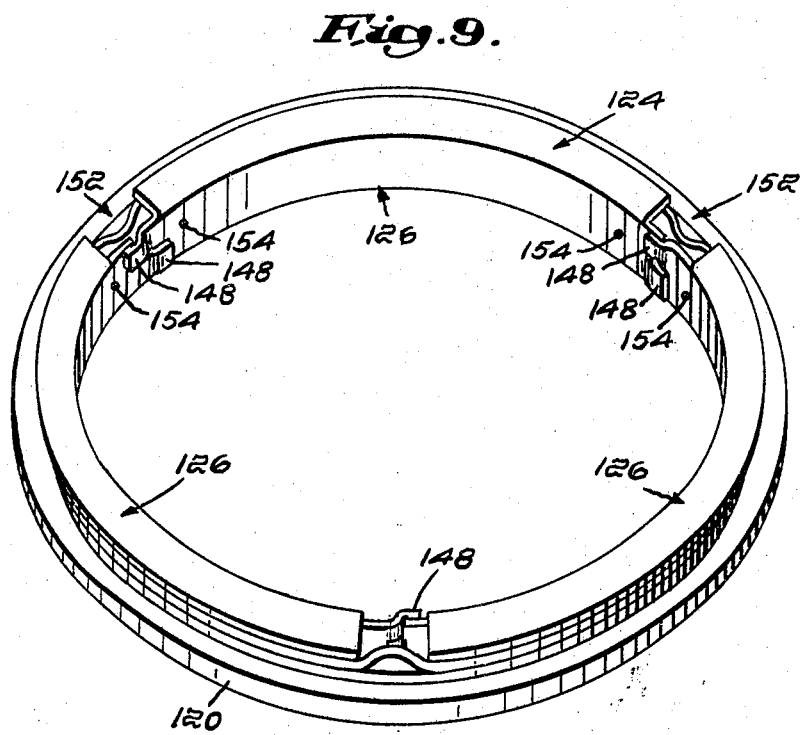
Inventor:
Frank S. Walker
by
Attorney United States Patent Office 3,482,366
Patented Dec. 9, 1969

3,482,366
LEAKPROOF RUBBER SEAL ASSEMBLY
Frank S. Walker, 30 Belview Heights,
Ashland, Mass. 01721
Continuation-in-part of application Ser. No. 674,393,
Oct. 11, 1967. This application Feb. 28, 1968, Ser. No.
711,827
Int. Cl. E06b 7/23, 1/36
U.S. Cl. 52—214                                 14 Claims

ABSTRACT OF THE DISCLOSURE

A rubber seal assembly for a window or the like in a wall or roof opening having provision for clamping the rubber seal in weathertight engagement about the marginal edges of the opening.

CROSS-REFERENCE TO RELATED APPLICATION

This application is a continuation-in-part of my co-pending application, Ser. No. 674,393, filed Oct. 11, 1967, now abandoned.

This invention relates to a leakproof rubber seal assembly particularly adapted for use in the installation of a skylight in the roof of a vehicle body or the like.

The invention has for an object to provide a novel and improved rubber seal assembly of the character specified which is characterized by supporting structure adapted to prevent upward or lateral displacement of the assembly from the roof in a novel and efficient manner.

The invention has for another object to provide a novel and improved rubber seal assembly of the character specified which is further characterized by novel structure for assuring a tight and leakproof seal between the opening in the roof and the assembly.

With these general objects in view and such others as may hereinafter appear, the invention consists in the rubber seal assembly for a skylight or the like and in the supporting structure therefor as hereinafter described and particularly defined in the claims at the end of this specification.

In the drawings illustrating the preferred embodiment of the invention:

FIG. 2 is a cross sectional view taken on the line 2—2 of FIG. 1;

FIG. 3 is a cross sectional view taken on the line 3—3 of FIG. 1;

FIG. 4 is a cross sectional view of a modified form of lighting to be described;

FIG. 5 is a cross sectional view of a form of a leakproof rubber seal assembly to be described;

FIG. 6 is a detail view in cross section of a modified form of leakproof rubber seal assembly;

FIG. 7 is a detail view in cross section of another preferred form of assembly;

FIG. 8 is a plan view detail of connecting means shown in FIG. 7; and

FIG. 9 is a perspective view of the underside of an assembly embodying the structure shown in FIGS. 7 and 8.

Figure 1:
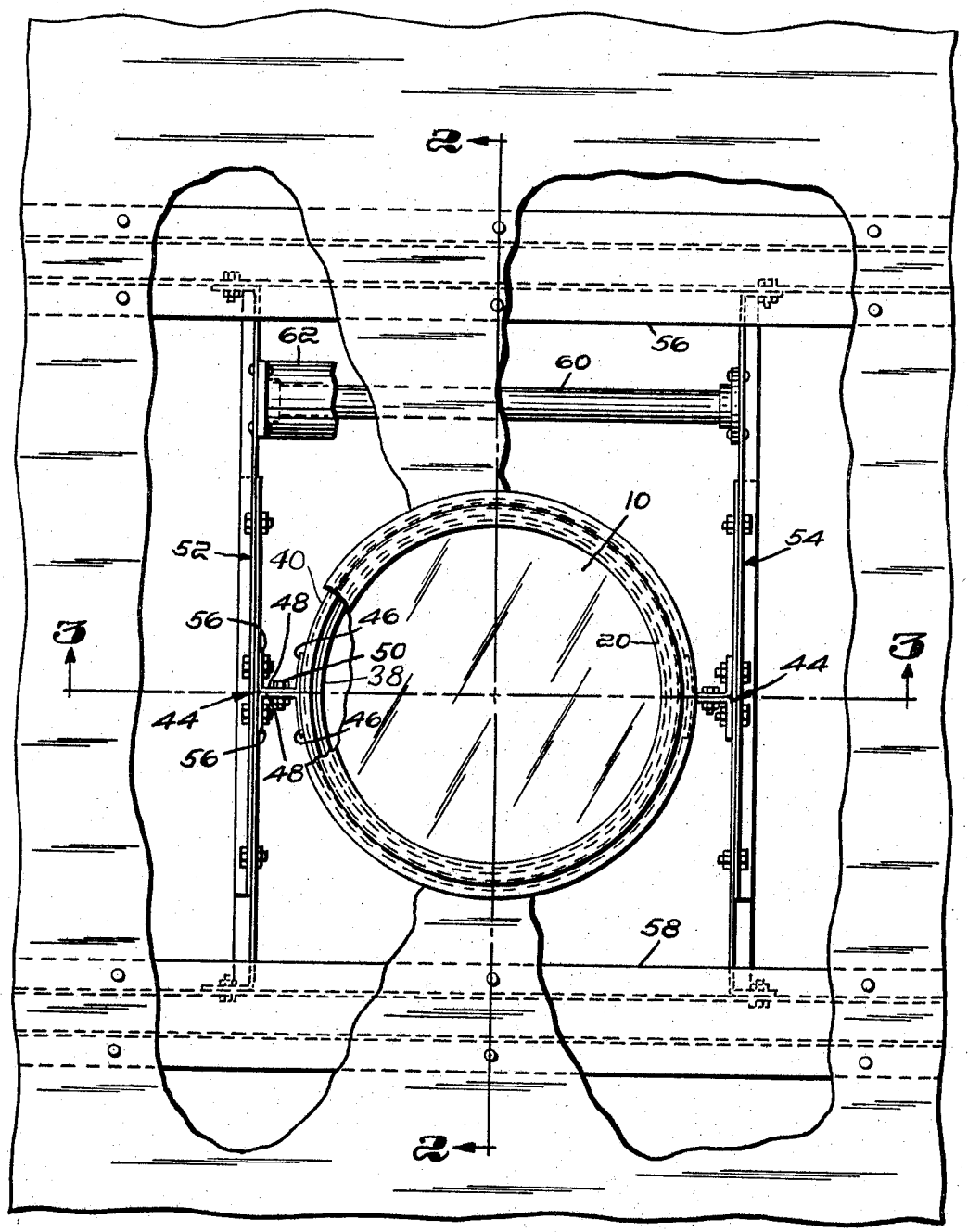
FIG. 1 is a plan view of a skylight embodying the present leakproof rubber seal assembly and its supporting structure.

In general, the present invention contemplates a novel and improved leakproof rubber seal assembly for a skylight of the type adapted to be installed in the roof of a vehicle body for admission of light. A conventional form of skylight assembly includes a rubber or like material sealing ring having an annular groove at its inner periphery for receiving the light admitting member and having an annular groove at its outer periphery adapted to be fitted about the edges of a roof opening to complete installation of the skylight. In practice, such prior skylight assemblies are subject to inadvertent upward and/or lateral displacement since they are held in assembled relation to the roof opening by the resilient sealing ring only.

Thus, in the even that the sealing ring is inadvertently struck from below, the ring may yield and pass upwardly through the opening. Likewise, in the event that the outer periphery of the ring is inadvertently engaged laterally by a stationary obstruction when the vehicle is underway, the resilient ring may yield and become disengaged from its roof opening. Such prior skylight assemblies are also subject to leakage around the edge of the roof opening in the event that the initial adhesive seal is inadvertently broken.

In accordance with the present invention, provision is made for supporting the skylight assembly and particularly the resilient sealing ring in a manner such that the sealing ring is protected from upward and lateral displacement whereby to prevent inadvertent removal of the skylight and the sealing ring assembly from its roof opening and also to avoid breaking of the initial adhesive seal of the resilient ring to the roof opening so as to avoid leakage therebetween. In a preferred form of the invention the resilient rim is also protected from upward and lateral displacement and is further arranged to clamp the sealing ring to the marginal edges of the roof opening whereby to assure a tight and leakproof seal between the roof opening and the ring.

Referring now to the drawings, the present assembly includes a transparent or translucent light admitting member 10 of glass fibers embedded in transparent resin or like material. The light admitting member 10 is fitted into an annular groove 12 formed at the inner periphery of a resilient sealing ring 14 of rubber or like material. In practice, the resilient ring 14 may be stretched around the marginal edge of the light admitting member 10 to assemble the parts. It will be observed that the marginal edge 16 of the light admitting member 10 is offset downwardly so that the upper face of the flange 18 defining one wall of the groove 12 is flush with the adjacent upper wall of the light admitting member. An adhesive tape 20 may be applied over the line defining the abutting portions of the flange 18 and the member 10.

The sealing ring 14 is further provided with an annular groove 22 in its outer periphery at a level below the groove 12, the groove 22 being defined on one side by a lower flexible flange 24. In order to assemble the resilient ring 14 in the roof 26, the flexible flange 24 is bent downwardly and inwardly to afford entrance of the skylight assembly into an opening 30 in the metal roof whereupon the flange 24 will flex back to its original position to secure the skylight in the roof. The groove portions 12 and 22 may be provided wtih a suitable cement to assist in providing a substantially weathertight seal. The body of the resilient ring 14 is further provided with a depending extension 32 coextensive with the inner wall 34 of the sealing ring as shown.

In order to prevent upward and lateral displacement of the asembly from the roof of the vehicle, as thus far described, an annular metal supporting and protective ring 36 is provided to fit against the underside of and within the inner periphery of the resilient ring 14 as shown in FIGS. 2 and 3. As herein shown, the supporting ring 36 is provided with an upwardly extending rim portion 38 engageable with the inner periphery 34 of the sealing ring, a downwardly extended rim portion 40, and an intermediate connecting portion 42 arranged to fit under and support the flexible flange 24 and also shaped to fit around the extension 32 as shown.

The protective ring 36 is preferably made in two semi-circular sections held together with their ends in abutting relation by opposed U-shaped extensions 44, see FIG. 1, the legs 46 of which are spot welded or otherwise secured to the abutting sections of the ring 36, and the webs 48 of which are connected together by bolts 50. The protective ring 36 is supported against the underside of the resilient ring 14 by spaced parallel bars 52, 54 to which the legs 56 of the extensions 44 are bolted. The bars 52, 54 may comprise nested adjustable sections bolted together and secured at their ends to spaced U-shaped roof supporting ribs 56, 58 arranged at right angles to the bars 52, 54 as shown. Artificial lighting may be provided for nighttime use by a fluorescent lamp 60 supported between the bars 52, 54, as shown in FIGS. 1 and 2, and which is provided with a curved reflector 62. A modified form of artificial lighting, as shown in FIG. 4, may comprise conventional lamps 65, one of which is shown in FIG. 4, supported in an inverted U-shaped tie bar 66 extended between the supporting bars 52, 54, the inner surface of the tie bar 66, serving as a reflector.

From the description thus far, it will be seen that the underside of the sealing ring 14 is protected against inadvertent upward displacement by the metal ring 36, the horizontal or intermediate portion 42 of which rests against the flexible flange 24 to hold it against the marginal edge of the roof opening 30, thus preventing flexing of the flange and upward displacement of the sealing ring 14. The outside diameter of the protective ring 36 is larger than the diameter of the roof opening 30 as shown. Likewise, any lateral pressure against the outer periphery of the ring 14 will be resisted by the upstanding rim portion 38 which extends well above the level of the roof.

It will be observed that as thus far described the protective ring 36 supported with the horizontal portion 42 bearing against the flange 24 not only prevents inadvertent displacement of the sealing ring 14 but also serves in effect as a clamp wherein the flange 24 is clamped between the portion 42 and the underside of the marginal edge of the roof opening to provide a leakproof joint. The grooved portion 22 into which the marginal edges of the roof opening are received is initially provided with a weatherproof adhesive, and the protective ring 36 also serves to prevent damage to the adhesive seal to further assure a weathertight seal.

Referring now to FIG. 5, in a preferred form of rubber seal assembly for a skylight adapted for installation in an opening in a vehicle roof, the skylight includes a light admitting member 70 whose marginal edge 72 is fitted into an annular groove 74 formed in the inner periphery of a resilient sealing ring 76. The sealing ring is also provided with an annular groove 78 in its outer periphery having a flexible flange 80 arranged to be manipulated to assemble the skylight in the opening 82 of the vehicle roof 84.

In the preferred form of the invention, as shown in FIG. 5, the resilient sealing ring 76 is also provided with an extension 86 coextensive with the wall 88 defining the inner periphery of the sealing ring. The supporting and clamping structures shown in FIG. 5 includes an annular metal protective member 90 having an outer flange 92 engaging the flexible flange 80; an intermediate concave portion 94 fitted about the extension 86 and against the wall 88; and an inwardly extended horizontal flange 96. In practice, the annular protective member 90 may be made in two semicircular sections, if desired, which may be connected together in any usual or preferred manner. In order to hold the protective member 90 in operative engagement with the underside of the resilient sealing ring 76, an upper retaining and clamping ring 100 is provided. The clamping ring 100 includes an upstanding rim portion 102 which bears against the wall 88; an upper horizontal and outwardly extended flange portion 104 fitted into an annular groove 106 formed in the body of the resilient ring 76 intermediate the upper and lower annular grooves 74, 78, respectively; and an inwardly extended horizontal lower flange portion 108. The lower flange portion 108 is parallel to and spaced from the flange 96, the flange 108 and the flange 96 each being provided with aligned openings for receiving bolts 110 provided with nuts 112. In operation, when the bolts and nuts are tightened, the lower annular protective member 90 is drawn upwardly into engagement with the underside of the resilient ring 76 and the upper retaining member 100 is drawn downwardly. As a result, the body portion of the rubber sealing member 76 above the marginal edge of the roof opening and the flange portion 80 below the marginal edge of the roof opening are clamped in watertight and leakproof engagement about the marginal edges of the opening. It will also be observed that the preferred structure shown in FIG. 5 not only protects the resilient ring 76 from upward or lateral displacement but also clamps the sealing ring in leakproof engagement with the marginal edges of the roof opening.

Referring now to FIG. 6, in a further modified form of the invention, the rubber seal assembly comprises a resilient ring 114 similar to that shown in FIG. 5 except that the grooves 74, 106 instead of being spaced apart are combined to form a single groove 115 providing space for receiving both the light admitting member 70 and the flange portion 104 of the clamping ring 100. It will be observed that the lower part of the groove 115 for receiving the flange portion 104 extends radially outward beyond the edge of the upper portion fo the groove for receiving the light admitting member, thus forming a portion 116 as illustrated. Otherwise, the structure shown in FIG. 6 is the same as that shown in FIG. 5, like numerals denoting like parts.

The rubber seal assembly including the clamping portions 90 and 100 have been herein defined as circular. However, it will be understood that the present assembly may also be used with advantage for sealing light admitting members in wall or roof openings which are rectangular as well as circular. It will also be understood that the members 90 and 100 by which the rubber sealing element is clamped about the marginal edges of the opening and which have been defined as comprising continuous rings or semicircular members may also be made in individual sections if desired. Although the invention has been described as applied to a skylight installed in the roof of a vehicle, it will be apparent that the present invention will find utility in the installation of a light admitting member in any wall of an enclosure.

FIGS. 7 and 8 illustrate another preferred form of the invention which differs from the structure shown in FIG. 6 in that the means for retaining the resilient sealing ring 120 in weathertight and non-displaceable engagement with the upper and lower faces of the marginal edges of the opening in the wall or roof structure 122 comprises an annular metal retaining ring 124, U-shaped in cross section, and which is made in a plurality of arcuate sections 126, herein shown as three sections, arranged to be joined together in abutting relation and in clamping engagement with the resilient sealing ring without the use of bolts and nuts as required in the FIG. 6 structure.

Each section 126 of the retaining ring 124, as shown in cross section in FIG. 7, is provided with upper and lower outwardly extended horizontal legs or flanges 128, 130, respectively, which extend from the vertical connecting leg 132 of the U. The resilient sealing ring 120 is of conventional form, being provided with inner and outer grooves 134, 136, respectively; flexible flanges 138, 140; and a depending extension 142 which is normally coextensive with the inner wall 144 of the ring.

As illustrated in FIGS. 7 and 8, the ends of each arcuate section 126 have an abutting face 146 and an offset extension 148, the extension of one end being arranged to overlap the abutting face of the end of an adjacent arcuate section. With this construction it will be seen that after assembly of the light admitting member 150 in the groove 134 and assembly of the resilient ring 120 in the opening of the wall or roof, one of the U-shaped sections 126 may be assembled with the unit by urging the upper flange 128 into the groove 134 under the marginal edge of the light admitting member 150 and, simultaneously therewith, urging the lower flange 130 against the resilient extension 142 to force the latter to lie flat against the underside of flange 140 as shown in FIG. 7. The sections 126 may be pressed into assembled position to present the connecting leg 132 against the inner wall 144 of the resilient ring 120 either manually or by use of suitable tools, and when thus assembled, it will be seen that the sections are resiliently retained in position by virtue of the elasticity of the ring 120 whereby to provide in effect resilient clamping pressure against the upper and lower faces of the marginal edges of the opening in the wall of an enclosure.

As further illustrated herein, the flange portions 128, 130 are cut away for a short distance from each end of the sections 126, as indicated at 152, whereby the abutting faces 146 and offset portions 148 occur in the connecting leg portions 132 free of the flanges. In assembling the second and third sections 126 of the three arcuate sections, the adjacent ends may be placed in overlapping and abutting relation with respect to the ends of the first assembled section and pressed into position. At this point in the assembly, the remaining adjacent ends of the second and third sections 126 extend in offset relation with their abutting ends overlapped and in order to spread the ends apart so as to permit overlapping of the offset portions 148 with the abutting portions 146, openings 154 are provided in the vertical legs 132 adjacent the ends thereof adapted to receive a spreading tool, not shown. When the ends are spread apart as permitted by the elasticity of the sealing ring, the parts are manipulated to place the offset portions 148 in overlapping relation to the abutting portions 146 whereupon the tool is removed and the sections brought together in abutting relation to form the ring 124.

It will be seen that the structure shown in FIGS. 7 and 8, wherein an annular metal member 124 is arranged to embrace portions of the sealing ring 120 above and below the marginal edges of the opening into which the unit is assembled, serves to clamp the ring into weathertight engagement with said marginal edges and further serves to prevent upward or lateral displacement from the opening in a simple and efficient manner without the use of bolts and nuts or other fastening elements. It will be understood that the entire structure shown in FIGS. 7 and 8 is of conventional form except for the novel retaining ring or annular metal member 124. Thus, in practice, the present retaining ring 124 is of particular advantage in that it is capable of being installed in existing skylights whereby to render them weathertight and non-displaceable in the wall opening in which the unit is assembled.

While the preferred embodiment of the invention has been herein illustrated and described, it will be understood that the invention may be embodied in other forms.

Having thus described the invention, what is claimed is:

1. A leakproof rubber seal assembly adapted to support a light admitting member and to be fitted about an opening in a wall of an enclosure, said assembly comprising an annular resilient sealing ring having a groove in its inner periphery for receiving the outer edge of said light admitting member, said resilient sealing ring also having a groove in its outer periphery providing a lower flange fitted over the marginal edge of said opening, an annular metal protective member fitted against the underside of said resilient sealing ring having an upstanding rim portion fitted within the inner periphery of said ring and having a portion arranged to bear against said lower flange, and means for supporting said protective member in operative relation to said sealing ring whereby to resist inadvertent upward and lateral displacement of the assembly from the opening and to maintain a weathertight seal around said opening, said upstanding rim portion extending beyond the plane of said wall.

2. A leakproof rubber seal assembly adapted to support a light admitting member and to be fitted about an opening in a wall of an enclosure, said assembly comprising an annular resilient sealing ring having a groove in its inner periphery for receiving the outer edge of said light admitting member, said resilient sealing ring also having a groove in its outer periphery providing a lower flange fitted over the marginal edge of said opening, an annular metal protective member fitted against the underside of said resilient sealing ring having an upstanding rim portion fitted within the inner periphery of said ring and having a portion arranged to bear against said lower flange, and means for supporting said protective member in operative relation to said sealing ring whereby to resist inadvertent upward and lateral displacement of the assembly from the opening and to maintain a weathertight seal around said opening, said annular protective member being made in two semicircular sections connected together in abutting relation.

3. A leakproof rubber seal assembly adapted to support a light admitting member and to be fitted about an opening in a wall of an enclosure, said assembly comprising an annular resilient sealing ring having a groove in its inner periphery for receiving the outer edge of said light admitting member, said resilient sealing ring also having a groove in its outer periphery providing a lower flange fitted over the marginal edge of said opening, an annular metal protective member fitted against the underside of said resilient sealing ring having an upstanding rim portion fitted within the inner periphery of said ring and having a portion arranged to bear against said lower flange, and means for supporting said protective member in operative relation to said sealing ring whereby to resist inadvertent upward and lateral displacement of the assembly from the opening and to maintain a weathertight seal around said opening, said supporting means comprising an upper clamping element having portions fitted within an additional groove in the inner periphery of the sealing ring and secured to portions of said annular metal protective member whereby to effect clamping of the sealing ring to the enclosure wall.

4. An assembly as defined in claim 3 wherein the protective member is provided with an inwardly directed flange, and said clamping element is provided with an inwardly directed flange bolted to said first flange whereby to clamp the sealing ring about the marginal edge of said opening.

5. An assembly as defined in claim 4 wherein said clamping element flange is spaced from said first flange to permit clamping clearance when the bolts are tightened.

6. An assembly as defined in claim 3 wherein said additional groove is disposed intermediate said light admitting member and the roof.

7. A leakproof rubber seal assembly comprising a resilient sealing member having means for supporting a light admitting member and having a grooved portion in its outer periphery adapted to receive the marginal edges of an opening in a wall of an enclosure, the improvement comprising: means engageable with said sealing member at points above and below said marginal edges arranged to clamp the resilient sealing member about said marginal edges, said clamping means including a protective member engageable with the underside of the sealing member, a retaining member having a portion fitted within a groove formed on the inner periphery of the sealing member above said opening, and means connecting said protective member and said retaining member arranged to clamp the sealing member about said marginal edge.

8. An assembly as defined in claim 7 wherein the light admitting member is fitted within a groove formed in the inner periphery of the resilient sealing member, said groove being enlarged and expanded to also receive a flanged portion of said retaining member.

9. A leakproof rubber seal assembly comprising a resilient sealing member having an interior groove for receiving the marginal edges of a light admitting member and having an exterior groove adapted to receive the marginal edges about an opening in a wall of an enclosure, the improvement comprising a metal retaining member disposed within said opening, said retaining member having upper and lower outwardly extended flanges arranged to tightly embrace those portions of the sealing member disposed above and below said marginal edges, said retaining member being held in assembled and clamped engagement with the marginal edges of the opening by the resiliency of the sealing member.

10. A leakproof rubber seal assembly as defined in claim 9 wherein the retaining member is U-shaped in cross section.

11. A leakproof rubber seal assembly as defined in claim 9 wherein the upper flange is inserted within said interior groove together with the marginal edges of said light admitting member.

12. A leakproof rubber seal assembly as defined in claim 9 wherein the sealing member is provided with a horizontally extended flap under said exterior groove, and with a depending extension, said lower flange pressed against said depending extension to cause it to lie against said flap in the completed assembly.

13. A leakproof rubber seal assembly as defined in claim 9 wherein the retaining member is made in a plurality of sections, the ends of each section adapted for abutting engagement with the ends of adjacent sections to provide, in effect, a continuous retaining member extending about the marginal edges defining said wall opening.

14. A leakproof rubber seal assembly as defined in claim 13 wherein the abutting ends of each section are provided with offset extensions arranged to overlap the abutting ends of adjacent sections.

References Cited

UNITED STATES PATENTS

| | | | |
|---|---|---|---|
| 2,105,180 | 1/1938 | Blessin | 52—208 |
| 2,407,086 | 9/1946 | Ledwinka et al. | 52—208 |
| 2,989,338 | 6/1961 | Hezler | 52—213 X |
| 2,989,787 | 6/1961 | Smith | 52—208 X |

FRANK L. ABBOTT, Primary Examiner.

P. C. FAW, Jr., Assistant Examiner

U.S. Cl. X.R.

52—200, 403, 718; 240—7.35